J. D. McCOY.
TIRE CHAIN TOOL.
APPLICATION FILED SEPT. 25, 1920.
1,397,592.
Patented Nov. 22, 1921.
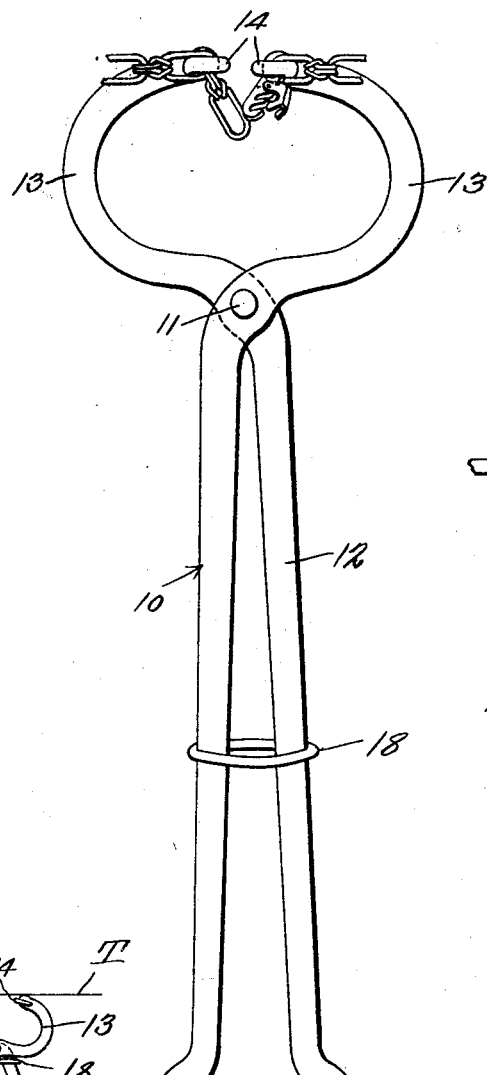
Fig. 1.
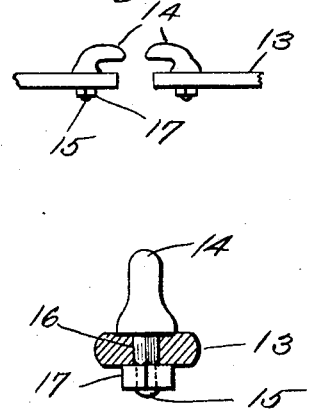
Fig. 2.
Fig. 3.
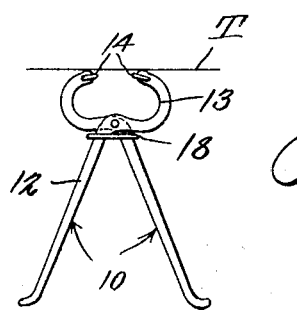
Fig. 4.
Inventor,
J. D. McCoy
By C A Snow & Co.
Attorneys.

UNITED STATES PATENT OFFICE.

JOHN D. McCOY, OF KIRKSVILLE, MISSOURI.

TIRE-CHAIN TOOL.

1,397,592.   Specification of Letters Patent.   Patented Nov. 22, 1921.

Application filed September 25, 1920. Serial No. 412,823.

*To all whom it may concern:*

Be it known that I, JOHN D. McCOY, a citizen of the United States, residing at Kirksville, in the county of Adair and State of Missouri, have invented a new and useful Tire-Chain Tool, of which the following is a specification.

This invention relates to a tool for use in connection with anti skid chains used on automobile wheels and has for its object the provision of a device whereby the ends of the chain may be drawn together and thereby facilitate the operation of securing said ends together.

Another object is the provision of offset engaging hooks whereby the links of the chain may be readily placed over the hooks.

Another object is the provision of removable hooks so that the same may be replaced in case of breakage of said hooks.

Still another object is the provision of opposite disposed arcuate jaws whereby space is provided for conveniently connecting the ends of the chain.

With these and other objects in view which will appear as the description proceeds, the invention resides in the novel combination and arrangement of parts hereinafter alluded to and particularly pointed out in the appended claim.

It is to be understood that minor changes may be made in the device within the scope of what is claimed without departing from the spirit of the invention or sacrificing any of the advantages thereof.

In the drawing:—

Figure 1 is a plan view of the device, the same being shown in closed position;

Fig. 2 is a detail view in elevation of the ends of the jaws;

Fig. 3 is a sectional view on line 3—3 of Fig. 2;

Fig. 4 is a view similar to Fig. 1 drawn to a smaller scale and showing the device in position for attachment of the chain thereto.

Referring to the drawing forming a part of this specification, the numeral 10 designates generally one of the members of which two constitute the device.

The two members 10 are hingedly mounted together as shown at 11, each being provided with a handle 12 at one side of the pivotal point and an arcuate jaw 13 at the other side. The point of the jaws approach each other in the same plane and are provided with a hook shaped member 14. A shank 15 forms a part of the member 14 and has a rectangular portion fitting a socket 16 formed in the jaw 13. The outer end of the shank is round and screw threaded and a nut 17 secures the shank in place in the socket.

A ring 18 embraces the two handles and is adapted to be moved longitudinally of said handles when the jaws are brought together to hold the same while the ends of the chain are fastened together. The ends of the handles are shaped to prevent the ring 18 from being moved over the ends of the handles when the jaws are closed.

The device may be readily used by a person without assistance to draw the ends of the chain together, by placing the ends of the jaws against the tire as shown in Fig. 4 and holding the tool steady in this position with one hand while engaging the links of the chain over the hooks 14 with the other hand. The arrangement of the hook with relation to the jaws permit the tool to be thus supported and still leave the hooks free for attachment of the chain. The handles are then manipulated to draw the ends of the chain together as shown in Fig. 1, and the ring 18 is moved back on the handles to hold the slack thus taken up. The arcuate shape of the jaws 13 form an unincumbered space where connection of the links of the chain may be conveniently made.

Having thus described the invention what is claimed is:—

In a device of the class described, a pair of crossed members pivotally connected at their point of crossing and each comprising a jaw and a handle, the jaws being provided on their side surfaces, at points adjacent to their ends, with hooks which project toward each other, the hooks being located in a plane at right angles to the plane defined by the jaws and the handles.

In testimony that I claim the foregoing as my own, I have hereto affixed my signature in the presence of two witnesses.

JOHN D. McCOY.

Witnesses:
  MANLY McCoy,
  SETH McCoy.